United States Patent [19]
Westbrook

[11] 3,800,391
[45] Apr. 2, 1974

[54] APPARATUS FOR REPAIRING VALVE GUIDE OPENINGS IN CYLINDER HEADS

[76] Inventor: Richard W. Westbrook, 30273 Rosemond, Franklin, Mich. 48025

[22] Filed: Jan. 6, 1972

[21] Appl. No.: 215,829

[52] U.S. Cl. .................... 29/255, 29/275, 408/75, 408/79
[51] Int. Cl. ............................................. B23b 41/00
[58] Field of Search ............ 29/255, 271, 272, 275; 408/75, 82, 88, 89, 90, 91

[56] References Cited
UNITED STATES PATENTS

| | | | |
|---|---|---|---|
| 3,157,068 | 11/1964 | Rickert | 408/75 |
| 2,834,233 | 5/1958 | Anderson | 408/75 |
| 1,510,866 | 10/1924 | Seppmann | 29/275 |

*Primary Examiner*—Othell M. Simpson
*Assistant Examiner*—Harold P. Smith, Jr.
*Attorney, Agent, or Firm*—Barnes, Kisselle, Raisch & Choate

[57] ABSTRACT

A base anchorable to the bottom of a cylinder head supports a carrier for linear and rotatable movement for alignment with an underlying valve seat and valve guide opening. A guide sleeve is shiftable on the carrier perpendicular to the valve seat axis. A probe inserted through the sleeve into the valve guide opening refines alignment of the sleeve. The sleeve has a tapered end engageable against the valve seat for final centering of the sleeve. The sleeve is arranged to guide a combined drill and reamer for enlarging the valve guide opening and to guide a tool by which a valve guide bushing is driven into the enlarged opening.

The base has a plurality of apertures through which anchor rods can be inserted into variously located bolt holes in different cylinder heads. Some of the apertures are contained in indexing discs for selective positioning thereof. Each anchor rod has a collet expansible in a bolt hole and a nut threadable against the base to anchor the base on the cylinder head.

42 Claims, 18 Drawing Figures

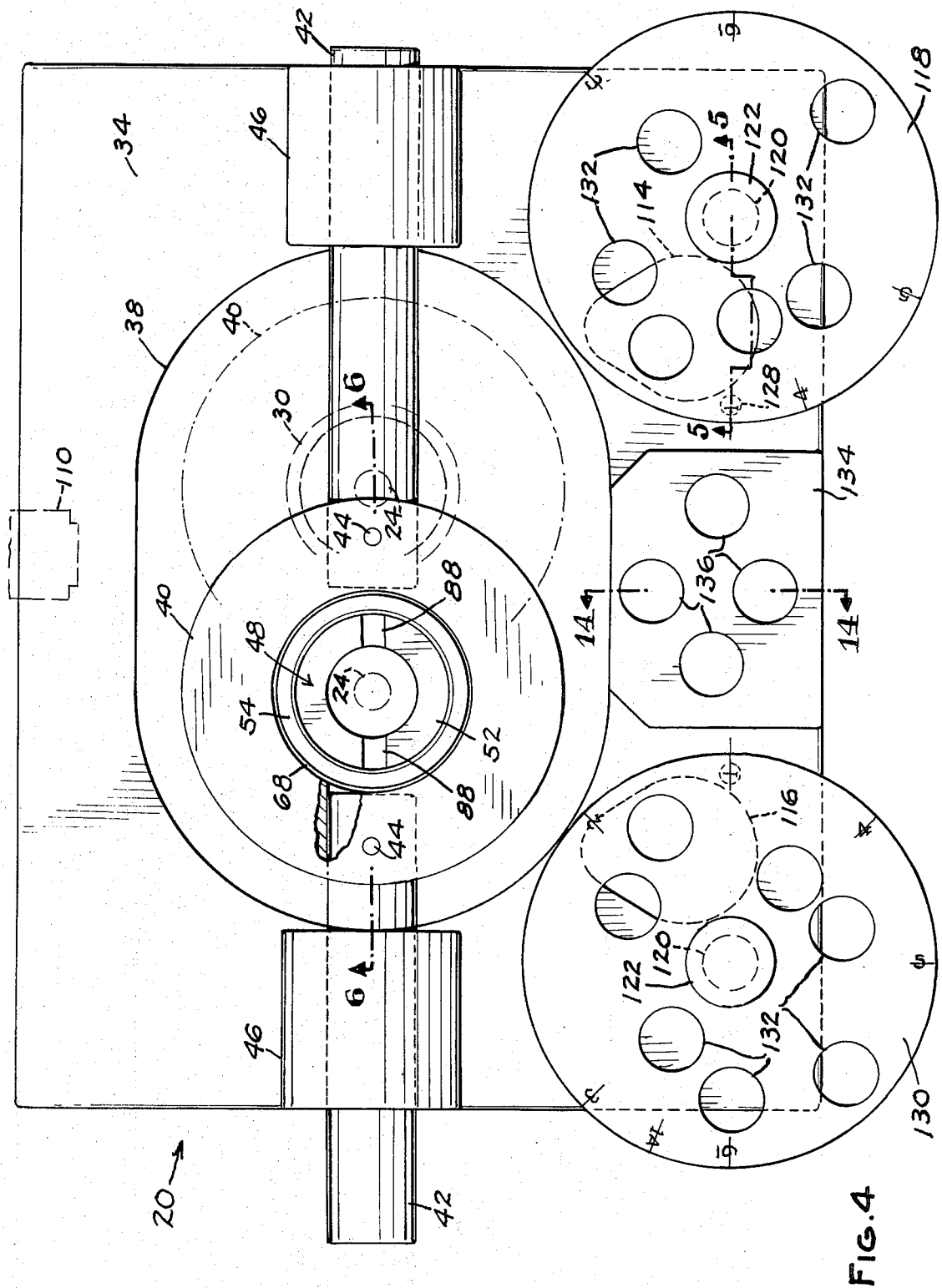

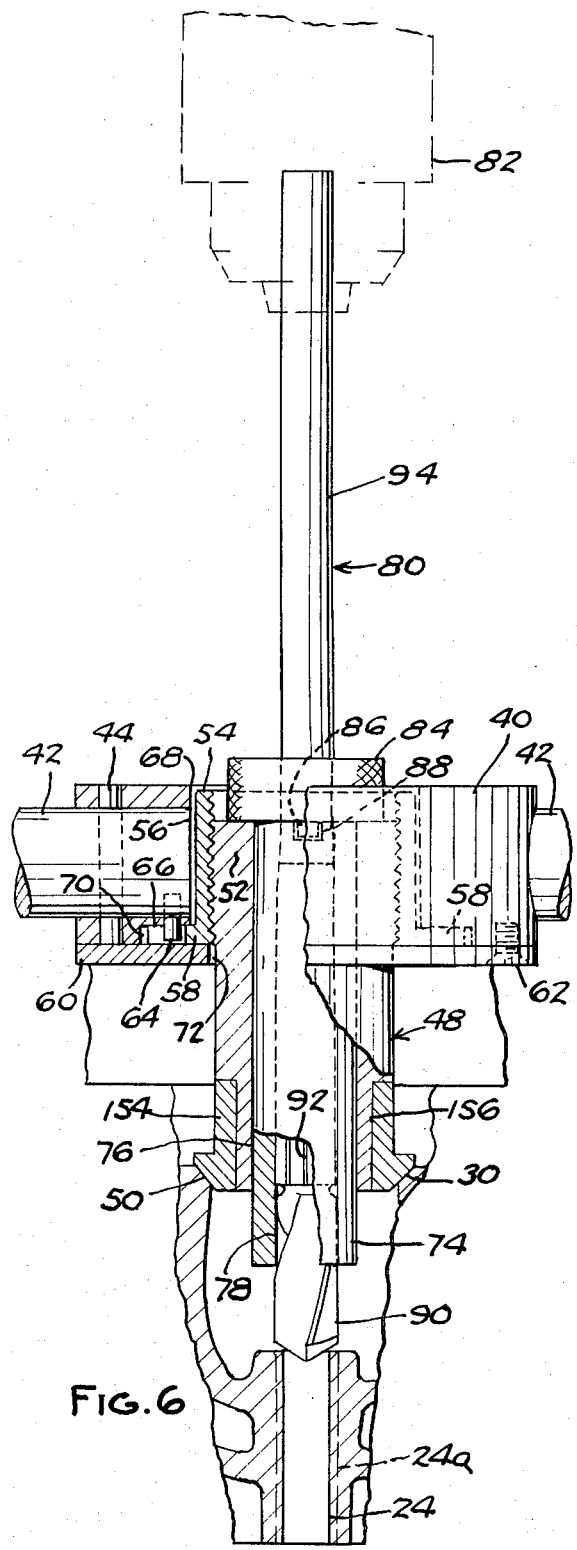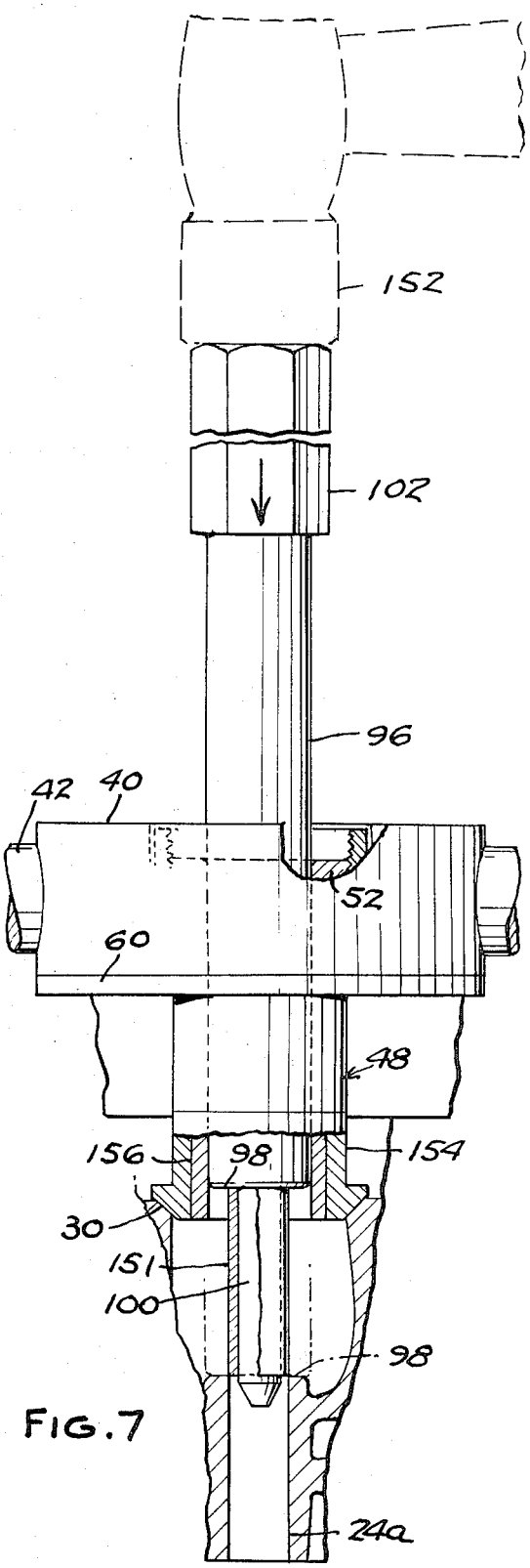

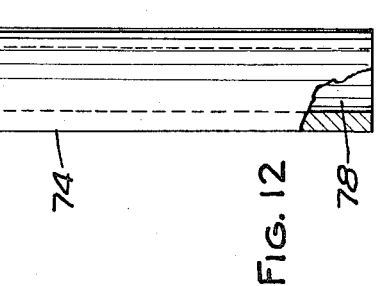
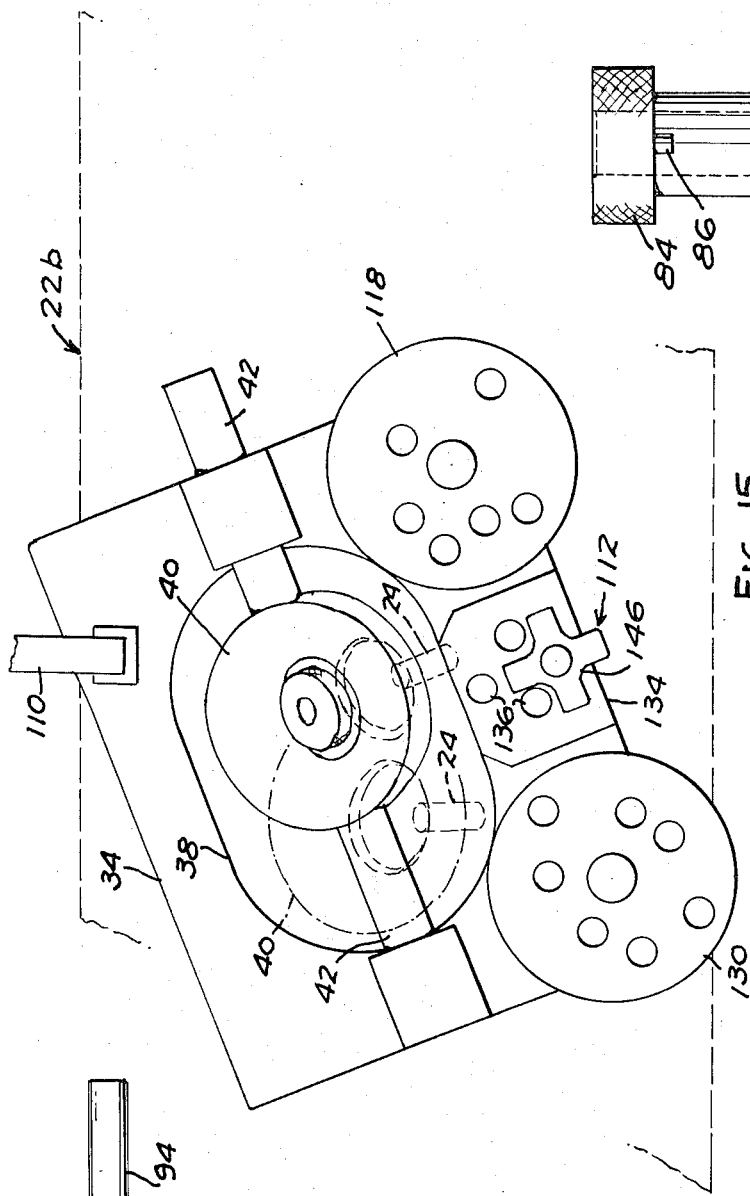
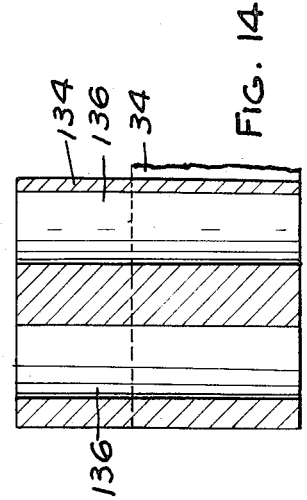
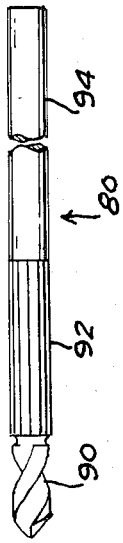
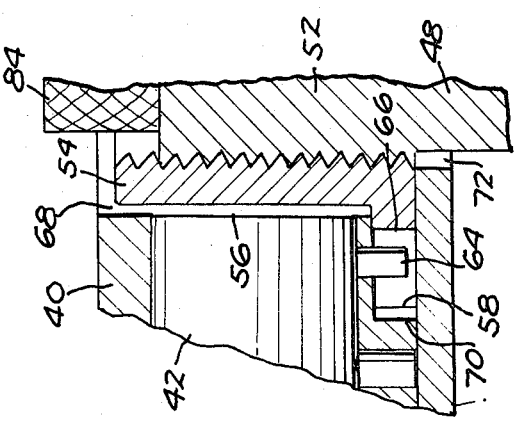

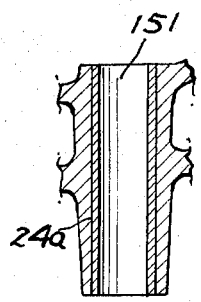
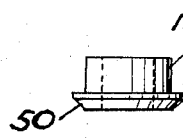
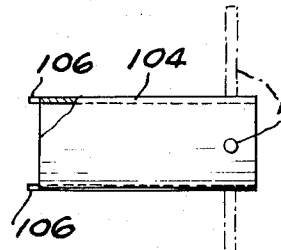
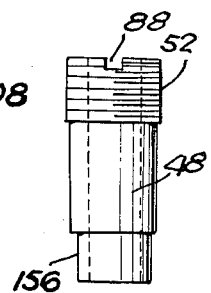
FIG. 8    FIG. 9    FIG. 10    FIG. 11
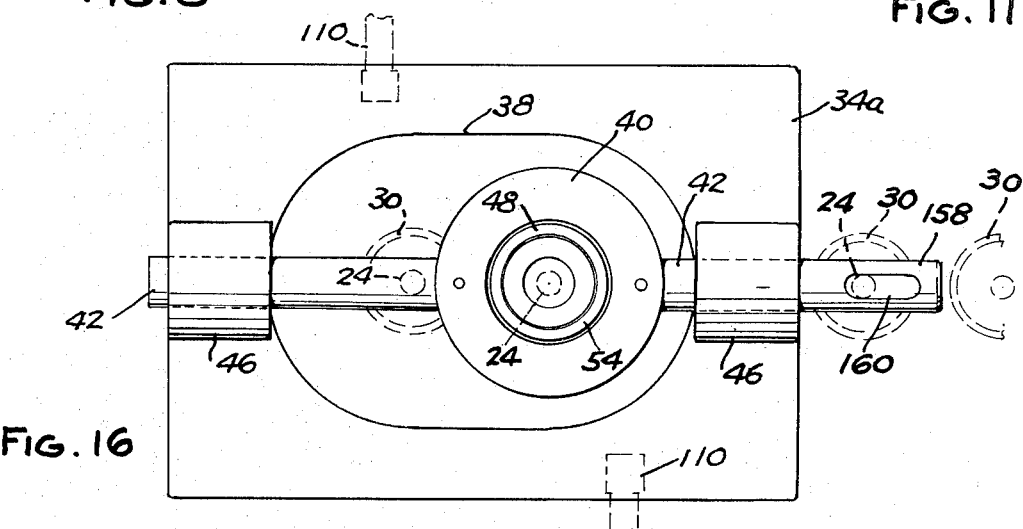
FIG. 16
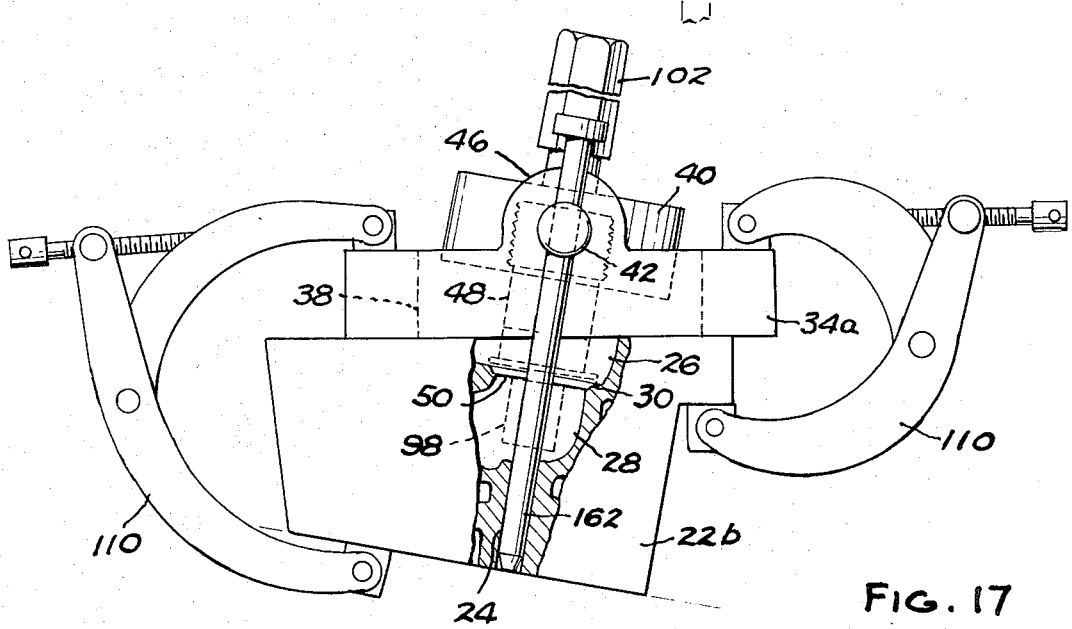
FIG. 17

APPARATUS FOR REPAIRING VALVE GUIDE OPENINGS IN CYLINDER HEADS

This invention relates to apparatus for repairing damaged valve guide openings in overhead type cylinder heads of internal combustion engines.

In passenger vehicles particularly, the valve guide openings in a cylinder head wear out or become damaged prematurely ofttimes before the manufacturer's warranty on the engine has expired. Numerous factors contribute to such damage or wear and these factors are believed to include the present day use of emission control devices and low-lead and non-leaded gasolines. Ordinary automotive repair shops such as those operated by automobile retailers are not equipped to repair valve guide openings. Under present conditions the automobile must be taken to a repair facility which is equipped with specialized relatively expensive equipment and personnel trained to operate the equipment. This results in inconvenience to the owner of the vehicle and repair is usually relatively costly.

Where the damage or wear occurs prior to expiration of the manufacturer's warranty on the engine the customary procedure is for the owner to return it to the dealer from whom he purchased it. The dealer in turn must then take the vehicle to a specialized repair facility and then pick it up again for delivery to the customer when repairs have been effected. The manufacturer pays for the cost of the repair work but the dealer makes no profit and usually is not compensated for his inconvenience. Warranty repair of valve guide openings costs automobile manufacturers millions of dollars per year.

The object of the present invention is to provide a relatively simple inexpensive apparatus with which a mechanic at an ordinary repair or service garage, after only a few minutes of instruction and utilizing the tools normally available, can quickly and conveniently repair a worn or damaged valve guide opening in a cylinder head.

In general the invention contemplates the use of a base which can be anchored against the bottom of a cylinder head. A carrier is mounted on the base for linear movement across an underlying combustion chamber and for rocking movement to facilitate alignment of the carrier with the axis of a valve seat and its valve guide opening. A guide sleeve is mounted on the carrier so that it can shift in a plane perpendicular to the axis of the valve guide opening and seat. A tool insertable through the sleeve and into the valve guide opening refines alignment of the sleeve relative to that axis. The sleeve is movable toward the valve seat and a tapered end thereon finally centers the guide when the tapered end engages the valve seat. The guide sleeve serves as a guide for a combined drill and reamer for use in conjunction with an ordinary electric hand drill for enlarging the diameter of the valve guide opening. The aligning tool also serves as a tool by which a valve guide bushing is aligned with and driven into the enlarged opening to complete the repair.

The base has a plurality of apertures through which anchor rods are selectively inserted into variously located head bolt holes in different cylinder heads. Certain of the apertures are contained in indexing discs for aligning the apertures and head bolt holes selectively. Each anchor rod has a collet expansible in the head bolt hole and a nut thereon threadable against the base to secure the base into the cylinder head.

In the accompanying drawings:

FIG. 4 is a top plan view of the apparatus.

FIG. 6 is a view partly in elevation and partly in section along line 6—6 of FIG. 4 illustrating a drilling step in the repair procedure.

FIG. 6A is an enlarged fragmentary sectional view of a part of the structure shown in FIG. 6.

FIG. 7 is a view generally similar to FIG. 6 but illustrating a different step in the repair procedure.

FIG. 8 is a fragmentary sectional view illustrating a valve guide bushing in place upon completion of the repair procedure.

FIG. 9 is an elevational view of a centering collar.

FIG. 10 is an elevational view of a wrench.

FIG. 11 is an elevational view of a thread guide sleeve.

FIG. 12 is an elevational view of a drill guide bushing.

FIG. 13 is a fragmentary elevational view of a combined drill and reamer.

FIG. 14 is a sectional view on line 14—14 of FIG. 4.

FIG. 15 is a top plan view of the apparatus in use on a second type of cylinder head.

FIG. 16 is a smaller scale top plan view of a modified form of the invention.

FIG. 17 is an end view partly in elevation and partly in section of the structure shown in FIG. 15.

Figure 1:
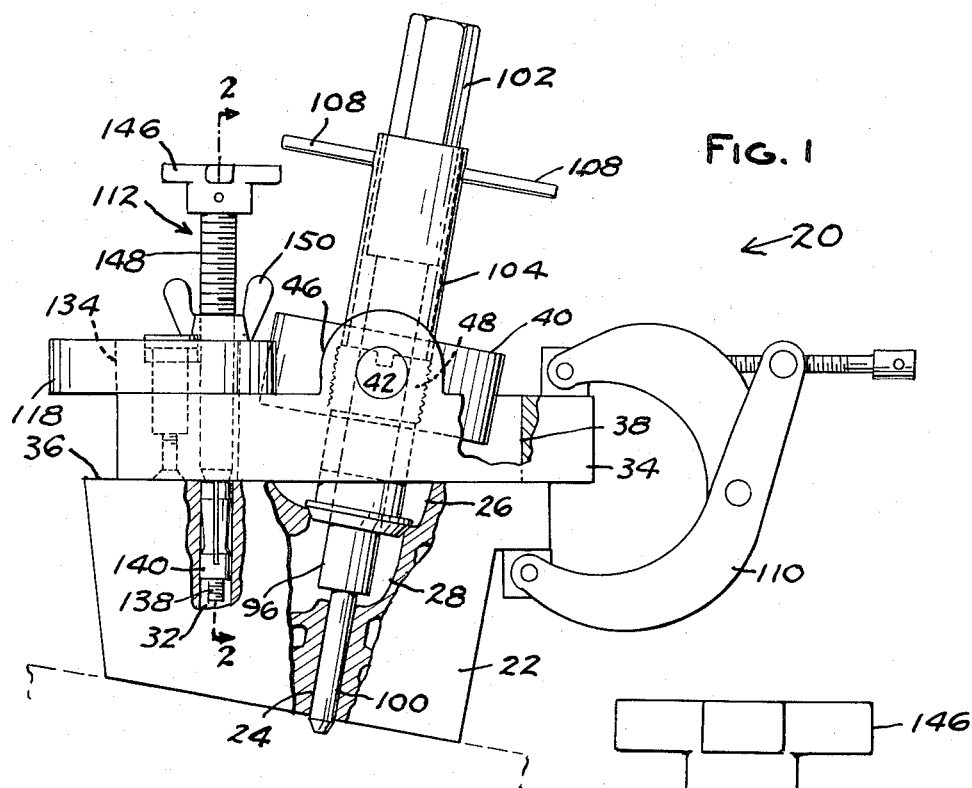
FIG. 1 is an end view partly in elevation and partly in section illustrating an apparatus according to the present invention assembled to a cylinder head.

Shown in FIG. 1 is an apparatus 20 according to the present invention assembled with a conventional overhead valve cylinder head 22 for repairing a worn or damaged valve guide opening 24 therein. The cylinder head has a combustion chamber 26 and an adjacent port 28 which as shown may be either an intake port or an exhaust port. Port 28 is closed and opened by movement of the tapered head of a conventional valve (not shown) to and from engagement with a tapered valve seat 30 between port 28 and the combustion chamber. Movement of the valve head is guided by movement of the valve stem within opening 24. The cylinder head is provided with a number of openings 32 for head bolts by which the cylinder head is anchored to the cylinder block.

Apparatus 20 includes a base plate 34 adapted to be fitted against the bottom 36 of the cylinder head. Plate 34 has a central aperture 38 dimensioned to span a combustion chamber 26. A carrier 40 is mounted on base 34 for linear movement across aperture 38 and for rockable or rotatable movement about an axis parallel to the direction of linear movement. The purpose of these movements is to facilitate general alignment of the carrier with the axes of valve seats 30 and valve guide openings 24 in the cylinder head.

In the illustrated apparatus carrier 40 is affixed to a pair of shafts 42 by such means as press fitted pins 44, shafts 42 being linearly slidable and rockable within bearing blocks 46 on plate 34.

A guide and centering sleeve 48 is mounted on carrier 40 in such a way that the axis of the sleeve can be shifted in a plane perpendicular to the axis of a valve seat 30 with which the carrier and sleeve are generally aligned. Sleeve 48 is also axially movable so that a tapered end 50 thereof can be centeringly engaged against valve seat 30. In the apparatus illustrated sleeve 48 has an end portion 52 threaded to a nut 54 disposed within central opening 56 in carrier 40. Nut 54 has a radially outward flange 58 axially contained within a chamber in the body of carrier 40 as best shown in FIG. 6, this chamber being defined in part by a cover 60 secured to the carrier body as by screws 62.

Nut 54 is constrained to limited turning movement with sleeve 52 by such means as a pin 64 press fitted into a shaft 42 and extending into the chamber and into an opening 66 in flange 58. The threading between sleeve end 52 and nut 54 thus provides a thrust connection which facilitates advancing and retracting of sleeve 48 relative to valve seat 30.

The walls of opening 56 are spaced radially outwardly of nut 54 and flange 58 to provide clearances 68 and 70 respectively. A radial clearance 72 is also provided between sleeve 48 and the surrounding portions of cover 60 through which the sleeve projects. Flange 58 fits loosely enough within its chamber and pin 64 fits loosely enough in opening 66 to facilitate shifting of nut 54 and sleeve 48 in a plane perpendicular to the axis of valve seat 30 as permitted by the various clearances 68-72.

A guide bushing 74 is slidably insertable into a guideway formed by the interior 76 of sleeve 48. The interior 78 of bushing 74 is dimensioned to provide a guideway for a bit 80 used in conjunction with a conventional hand-held drill 82 which may be electrically powered. Bushing 74 has a knurled head 84 to facilitate manipulation and a lug 86 depending from head 84 engages within one of a pair of recesses 88 in an end of sleeve 48 to contain bushing 74 against rotation with bit 80. Bit 80 preferably has a leading end portion 90 which is formed as a drill and, following portion 92 which is formed as a reamer, and a shank portion 94. Reamer 92 has a slightly larger diameter than drill 94, typically by about 0.015 inch, and shank 94 has a diameter the same as reamer 92.

A tool 96 fits slidably within interior 76 of sleeve 48 when bushing 74 has been removed from the sleeve. Tool 96 has a radial shoulder 98 from which a smaller diameter finger 100 projects. Finger 100 forms a probe dimensioned to fit within valve guide opening 24 to facilitate preliminary alignment of guideway 76 relative to opening 24 and valve seat 30. The other end 102 of tool 96 is shown as having an enlarged handle portion. A hollow wrench 104 is dimensioned to fit around handle 102 and has a pair of lugs 106 engageable within recesses 88 in the end of sleeve 48. Wrench 104 has handles 108 to facilitate turning sleeve 48 within nut 54.

Base 34 is anchored to the bottom 36 of cylinder head 22 by means of a C clamp 110 and a plurality of bolts 112. Base 34 is provided with a pair of apertures 114, 116 which are dimensioned and located so that they span the known positions of variously located holes or openings in a group of unlike cylinder heads with which the apparatus is adapted to be used. Advantageously, the cylinder head holes employed are head bolt openings 32.

A disc 118 is mounted for rotation on base 34 by a pivot 120. The pivot has a head 122 which fits slidably within a deeper axial recess 124 in disc 118. A positioning pin 126 projects upwardly from base 34 for slidable insertion selectively into any one of a number of circumferentially distributed recesses 128 in the bottom of disc 118. A second disc 130 is rotatably mounted on base 34, the structure and mounting of this disc being similar to that of disc 118 except as noted below.

Each disc 118, 130 is provided with a number of openings 132 at different radial distances from the axes of pivots 120. The number and location of openings 132 in the respective discs may vary as shown. Each one of these openings is positioned for alignment with a head bolt opening 32 or other opening of a given cylinder head which underlies one of the apertures 114, 116. When each opening 132 is so positioned, one of the recesses 128 in the underside of its respective disc 118, 130 is in alignment with pin 126. Thus when a recess and pin are interengaged as shown in solid lines in FIG. 5 the disc is locked in position with a selected opening 132 positioned for alignment with a known opening in the cylinder head.

Figure 5:
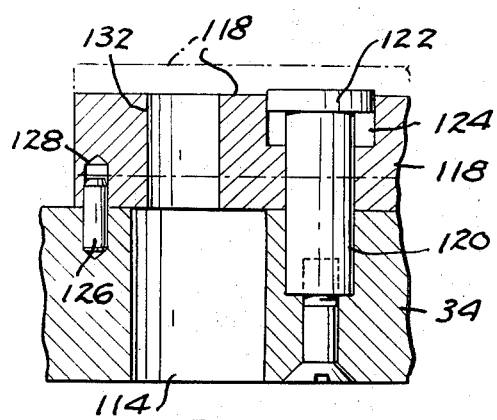
FIG. 5 is a sectional view on line 5—5 of FIG. 4.
Figure 3:
FIG. 3 is an end view of an expansion collet shown in FIG. 2.
Figure 2:
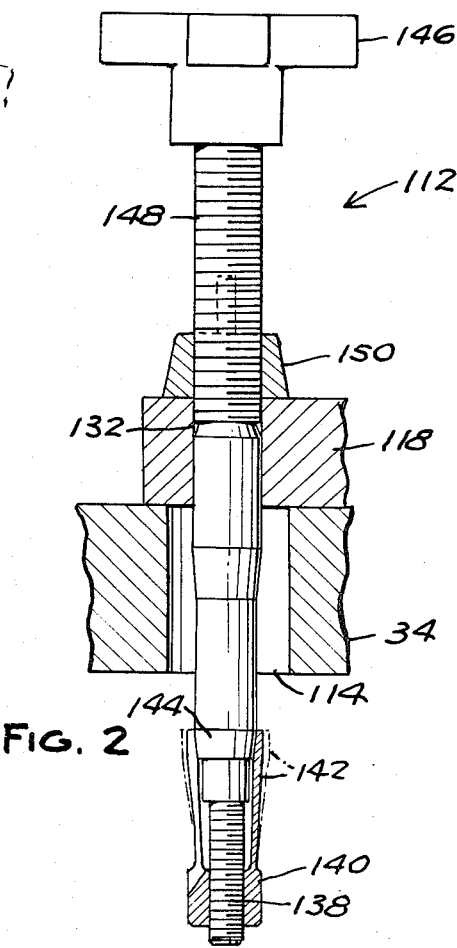
FIG. 2 is an enlarged sectional view on line 2—2 of FIG. 1.

To so position another opening 132 the disc is shifted axially to the dotted line position of FIG. 5 thereby disengaging recess 128 from pin 126. The disc is then turned to so position the newly selected opening 132 and is then returned to the solid line position of FIG. 5 to reengage the recess and pin for locking the disc in its new position. Discs 118, 130 may be provided with index numbers around their peripheries as shown. The positions of these numbers are correlated to the various positions of openings 132 and to the locations of recesses 128 and pin 126. This facilitates quick and convenient adjustment of the discs to desired positions.

Base 34 is provided with a boss 134 having a number of openings 136 whose positions are also correlated to the known positions of cylinder head openings, the function of which is described below.

Each anchor bolt or rod 112 is dimensioned to be inserted through an opening 132 in one of the index discs and through the underlying aperture 114 or 116. The bolt has a smaller diameter end portion 138 threaded into an expansion collet 140 having a number of separate fingers or segments 142 into which a wedge-shaped portion 144 of the bolt fits. Bolt end 138 with its collet 140 in unexpanded position are dimensioned to fit frictionally within a cylinder head opening such as head bolt opening 32. Bolt 112 has a handle 146 by which the bolt can be turned relative to collet 140 when the collet is inserted within opening 32.

The collet is restrained frictionally against turning within opening 32 so that when bolt 112 is turned for advancing wedge 144 into collet segments 142, these segments are expanded outwardly into tight engagement against the walls of opening 132. This anchors bolt 112 onto the cylinder head. Bolt 112 has a threaded shank which projects beyond base 34 and disc 118 or 130. A nut 150 on shank 148, when turned in the appropriate direction, clamps against index disc 118 or 130 for anchoring the apparatus against cylinder head 22.

In use the usual procedure is first to set discs 118, 130 in the manner described so that an opening 132 in each is positioned for alignment with an opening in the cylinder head to be worked on. Base 34 is placed upon bottom 36 of the cylinder head with the selected openings 132 aligned with their respective cylinder head openings. An anchor bolt 112 is inserted through each of the two selected openings 132, through respective apertures 114, 116, and into the cylinder head openings such as bolt openings 32. Bolt handles 146 are turned for anchoring collets 140 and the bolts 112 to the cylinder head in the manner described. Bolts 112 properly locate base 34 on head 22.

Nuts 150 on anchor bolts 112 are now tightened securely against index discs 118, 130. C-clamp 110 is applied to base 34 and cylinder head 22 at a location as close as possible to the valve guide opening 24 to be repaired. Base 34 is now anchored on the cylinder head. With guide bushing 74 removed from sleeve 48 and the sleeve retracted relative to nut 54 so that end 50 of the sleeve is clear of valve seat 30, carrier 40 is moved linearly along central aperture 38 and is rocked or rotated until it can be seen that sleeve 48 is generally aligned with the valve guide opening 24 to be repaired. Tool 96 is inserted through guideway 76 of sleeve 48 and probe 100 thereon is inserted into valve guide opening 24. This step may involve either slight linear or rocking adjusting of carrier 40 or lateral shifting of sleeve 48 and nut 54 in clearances 68–72 or both. In either event the alignment of sleeve 48 relative to the axis of seat 30 and opening 24 is refined during this step if refinement is required.

Wrench 104 is passed over handle portion 102 of tool 96 and its wrench lugs 106 are engaged within recesses 88 of sleeve 48. The wrench is turned to advance tapered end 50 of sleeve 48 into engagement against tapered valve seat 30. If the axes of sleeve 48 and seat 40 are not aligned the tapered surfaces cooperate to shift sleeve 48 in a plane perpendicular to the axis of the valve seat within clearances 68–72 to a position in which sleeve 48 and its internal guideway 76 are centered with respect to the valve seat. This step accurately aligns the axis of guideway 76 with the axis of valve guide opening 24.

After tool 96 has been withdrawn from guideway 76 and wrench 104 removed, guide bushing 74 is inserted into guideway 76. The axis of guideway 78 in bushing 74 is accurately aligned with the axis of valve guide opening 24. Bit 80 on drill 82 is inserted through guideway 78 and is accurately guided along the axis of the valve guide opening by engagement of the guideway surface with reamer portion 92 and/or shank 94 of the bit. When the bit is rotated and advanced along this axis it drills and reams the valve guide opening to an enlarged diameter 24a (FIGS. 6 and 7). Bit 80 and bushing 74 are now removed from guideway 76.

The combined drill and reamer bit is preferred since reamer portion 92 and shank 94 are capable of being accurately guided by guideway 78 and in one step the bit produces an opening 24a which is very accurately shaped, dimensioned, and centered.

A valve guide bushing 151 is fitted onto finger 100 of tool 96 with an end engaged against shoulder 98. Tool 96 is inserted into guideway 76 until the leading end of bushing 151 is adjacent the upper end as FIG. 7 is viewed of opening 24a. Bushing 151 is dimensioned to have a press fit within opening 24a. Force is now applied to tool 96 in the direction for forcing bushing 151 into opening 24a. This force can be applied simply by striking the end of tool 96 with a hammer 152. This force is transmitted to the bushing by shoulder 98 and the force is continued until bushing 151 is completely embedded in opening 24a (FIG. 8), at which time shoulder 98 bottoms against portions of the cylinder head adjacent opening 24a as shown in dotted lines in FIG. 7. Tool 96 is withdrawn from guideway 76 and the repair is completed.

If both valve guide openings in a single combustion chamber are to be repaired, clamping bolts 112 and C clamp 110 are left in place after repair of the first valve guide opening. Sleeve 48 is retracted relative to nut 54 by the use of wrench 104 until end 50 on the sleeve clears valve seat 30. Carrier 40 is then moved into general alignment with the adjacent valve seat as shown in broken lines in FIG. 4 and the refined alignment and repair procedures are repeated.

After completing repair of one or both valve guide openings sleeve 48 is retracted as described, C clamp 110 removed, nuts 150 turned for retraction from discs 118, 130 and anchor bolt handles 146 are turned for withdrawing wedges 144 relative to collet segments 142. Bolts 112 are then withdrawn from the various openings and the apparatus is removed from cylinder head 22.

In some cylinder heads 22b (FIG. 15), the valve guide openings and valve seats are disposed at angles which preclude the use of discs 118, 130, openings 132 and apertures 114, 116 for anchoring purposes. With certain of these cylinder heads a selected opening 136 in boss 134 is utilized instead. A single anchor bolt is passed through the selected opening 136 and inserted into a corresponding cylinder head opening. Collet 140 is expanded in the manner described to anchor bolt 112 in place. Bolt 112 serves as a pivot about which base 34 is then turned relative to the cylinder head to a position in which carrier 40 by its linear and rocking movement can be manipulated to align sleeve 48 with a valve seat and valve guide opening. Nut 150 is turned into clamping engagement against boss 134 and a C clamp 110 is applied to base 34 and the cylinder head as illustrated. The alignment and repair procedures described above may then be carried out.

Should the other of a pair of valve guide openings in cylinder head 22a require repair, nut 150 and C clamp 110 are loosened and sleeve 48 retracted. The angular position of base 34 is then readjusted and this may require removal of bolt 112 and insertion through a different opening 136. The anchoring, alignment, and repair procedures are then repeated.

The diameters of valve seats 30 vary in different types of cylinder heads and frequently the valve seat of an intake valve is larger than that of an exhaust valve. This necessitates variation of the diameter of tapered end 50 of sleeve 48. This variation is accomplished by providing a plurality of collars 154 having tapered ends 50 of different diameters. The tapered end of each collar is dimensioned for engagement with a valve seat or a particular size of within a particular size range. The collars are manually fitted selectively around a reduced end portion 156 of sleeve 48.

The modified form of the invention illustrated in FIGS. 16 and 17 is similar to the form described above except that it is simplified for use in connection with cylinder heads 22b wherein the valve seats and valve guide openings are arranged along a common center line. In this form of the invention, base plate apertures 114, 116, indexing discs 118, 130 and boss 134 are omitted. One of the shafts 42 has an extension 158 which projects beyond an end of base plate 34a and is provided with a slot-like or elongated opening 160.

In use base 34a is engaged against the bottom of the cylinder head as described above and opening 160 is aligned with a valve guide 24 opening beyond the end of the base. Tool 96 or other suitable locator pin 162 is inserted through opening 160 and into the aligned valve guide opening. Carrier 40 is moved linearly to align sleeve 48 with the valve guide opening to be repaired. This movement is permitted by slot 160. Tool 96 and slot 160 cooperate to provide general rotative alignment of sleeve 48 relative to the valve guide opening. However sufficient lateral play is provided between the slot and tool to facilitate rocking of carrier 40 and consequent rotative alignment of sleeve 48 relative to opening 24. Base 34a is anchored onto the cylinder head by C clamps 110 and the alignment and repair procedures described above are effected.

The invention thus provides an apparatus which is relatively simple to manufacture and which can be sold at a price which is well within the means of an ordinary automotive repair shop or garage. Typically an ordinary automobile mechanic can be adequately instructed in use of the apparatus in about 1 hour. Also typically, once a cylinder head has been disassembled from other parts of an engine, a damaged or worn valve guide opening 24 can be repaired in about 3 to 4 minutes time by the use of an apparatus according to the present invention. No additional tools or equipment are required other than those ordinarily available in a repair shop such as drill 82 and hammer 152.

I claim:

1. Apparatus for repairing valve guide openings in cylinder heads which comprises,
   a base adapted to be fitted against the bottom of a cylinder head,
   anchor means operable to anchor said base against the head,
   a carrier mounted on said base for linear and rotatable movement into general alignment with a valve seat on the cylinder head,
   said rotatable movement being about an axis substantially parallel to the direction of said linear movement,
   guide means supported by said carrier and being shiftable on said carrier in a plane substantially perpendicular to the axis of the valve seat,
   centering means operable responsive to engagement thereof with a valve seat to shift said guide means relative to said carrier into centered relation to the valve seat,
   said guide means being adapted to guide a bit for movement along said axis to facilitate enlarging the diameter of the valve guide opening.

2. The apparatus defined in claim 1 wherein said base has a valve seat access opening along which said carrier moves and has portions outwardly of said opening engageable by said anchor means, the range of said linear movement being at least as great as the distance between the axes of an intake valve seat and an exhaust valve seat in a single combustion chamber.

3. The apparatus defined in claim 2 wherein said carrier is mounted on shaft means rotatable and linearly movable in bearing means on said base.

4. The apparatus defined in claim 3 wherein said shaft means has an extension which projects beyond said base and has an aperture positioned for alignment with a valve guide opening adjacent said base, and a locator pin insertable through said aperture and into said adjacent valve guide opening to facilitate positioning said carrier relative to a valve guide opening to be repaired.

5. The apparatus defined in claim 4 wherein said aperture is elongate along the axis of said shaft means.

6. The apparatus defined in claim 1 and including in addition releasable thrust means operable to hold said centering means in centered engagement against a valve seat.

7. The apparatus defined in claim 6 wherein said thrust means includes means forming a threaded thrust connection between said guide means and carrier.

8. The apparatus defined in claim 7 wherein said guide means comprises a guide member and another member threaded onto said guide member to provide said thrust connection, said members being so shiftable as a unit relative to the axis of a valve seat.

9. The apparatus defined in claim 8 wherein said other member is shiftably mounted on said carrier and through said threaded connection supports said guide member.

10. The apparatus defined in claim 9 wherein said other member and carrier have portions interengageable to limit the range of said shifting movement to less than the effective range of movement of said centering means.

11. The apparatus defined in claim 1 wherein said centering means forms a part of said guide means.

12. The apparatus defined in claim 11 wherein said centering means comprises a tapered end portion of said guide means.

13. The apparatus defined in claim 12 including in addition releasable thrust means operable to move said end portion into engagement with a valve seat.

14. Apparatus for repairing valve guide openings in cylinder heads which comprises,
    a base adapted to be fitted against the bottom of a cylinder head,
    anchor means operable to anchor said base against the head,
    a carrier movably mounted on said base for movement into general alignment with a valve seat on the cylinder head,
    guide means supported by said carrier and being shiftable on said carrier in a plane substantially perpendicular to the axis of the valve seat,
    centering means operable responsive to engagement thereof with a valve seat to shift said guide means relative to said carrier into centered relation to the valve seat,
    said guide means being adapted to guide a bit for movement along said axis to facilitate enlarging the diameter of the valve guide opening,
    said guide means comprising sleeve means having interior surface portions defining a guideway,
    said sleeve means having exterior portions threaded into a nut mounted on said carrier so that said nut and sleeve means are so shiftable as a unit on said carrier,
    means constraining said nut means against axial movement on said carrier,
    said centering means being movable to and from engagement with a valve seat responsive to relative turning of said nut and sleeve means in opposite directions.

15. The apparatus defined in claim 14 wherein said carrier has recessing within which said nut is so shiftable, said recessing having surface portions which so constrain said nut, and means on said carrier and nut cooperable to restrain said nut from turning with said sleeve means.

16. The apparatus defined in claim 15 wherein said nut has a flange which fits within said recessing, said surface portions being engageable with said flange to so constrain said nut.

17. The apparatus defined in claim 16 wherein said recessing and flange are provided with said cooperable means.

18. The apparatus defined in claim 17 wherein said cooperable means comprises a pin projecting from a surface portion of said recessing into a slot in said flange.

19. The apparatus defined in claim 17 wherein said recessing is provided in part by a removable cover forming a part of said carrier and extending over said flange.

20. The apparatus defined in claim 14 and including in addition means forming a locating tool engageable within said guideway for guided movement along said axis, said tool having a probe portion insertable within a valve guide opening for refining the alignment of said centering means relative to the valve seat prior to engagement of said centering means against the valve seat.

21. The apparatus defined in claim 20 and including in addition means forming a wrench dimensioned to fit around said tool for engagement against an end of said sleeve means, said end and wrench having interengageable projecting means and recessing to facilitate turning of said sleeve means.

22. The apparatus defined in claim 20 wherein said guide means also includes a bit guide bushing which fits removably within said guideway, said bushing having interior surface portions which are adapted to guidingly engage a bit for movement along said axis.

23. The apparatus defined in claim 22 wherein said sleeve means and bit guide bushing have means interengageable to contain said bushing against rotation by a bit therein.

24. The apparatus defined in claim 14 wherein said sleeve means has an end portion, a plurality of collars having tapered end portions of different diameters, said collars being selectively mountable on said end portion of said sleeve means for engagement with valve seats of different dimensions, said tapered end portion of a collar on said sleeve means forming said centering means.

25. Apparatus for repairing valve guide openings in cylinder heads which comprises,
a base adapted to be fitted against the bottom of a cylinder head,
anchor means operable to anchor said base against the head,
a carrier movably mounted on said base for movement into general alignment with a valve seat on the cylinder head,
guide means supported by said carrier and being shiftable on said carrier in a plane substantially perpendicular to the axis of the valve seat,
centering means operable responsive to engagement thereof with a valve seat to shift said guide means relative to said carrier into centered relation to the valve seat,
said guide means being adapted to guide a bit for movement along said axis to facilitate enlarging the diameter of the valve guide opening,
said anchor means comprising a rod with an expansion collet threaded thereon, said collet being dimensioned to fit frictionally within a selected opening in a cylinder head,
said collet being expansible responsive to turning of said rod relative thereto for anchoring said rod in said selected opening, and clamping means on said rod operable to clamp said base against the cylinder head.

26. The apparatus defined in claim 25 wherein said base has an aperture through which said rod in anchored condition projects, said clamping means acting between said base and the projecting portion of said rod.

27. The apparatus defined in claim 26 wherein said projecting portion of said rod is threaded, said clamping means comprising a nut threaded onto said projecting portion and engageable against said base responsive to turning thereof for movement toward said collet.

28. The apparatus defined in claim 27 wherein said collet is dimensioned up to fit within a bolt opening in the cylinder head.

29. The apparatus defined in claim 28 wherein said collet has fingers which are spread relative to each other by a wedge on said rod responsive to said relative turning.

30. Apparatus for repairing valve guide openings in cylinder heads which comprises,
a base adapted to be fitted against the bottom of a cylinder head,
anchor means operable to anchor said base against the head,
a carrier movably mounted on said base for movement into general alignment with a valve seat on the cylinder head,
guide means supported by said carrier and being shiftable on said carrier in a plane substantially perpendicular to the axis of the valve seat,
centering means operable responsive to engagement thereof with a valve seat to shift said guide means relative to said carrier into centered relation to the valve seat,
said guide means being adapted to guide a bit for movement along said axis to facilitate enlarging the diameter of the valve guide opening,
said base having an aperture therethrough of a cross dimension adequate to span the positions of variously located bolt holes in a plurality of unlike cylinder heads,
a member having a plurality of openings therethrough, the positions of which are correlated to the various positions of the bolt holes,
said member being movable on said base for aligning said openings respectively with corresponding ones of said bolt holes,
said anchor means comprising an element insertable through a selected opening and into the corresponding bolt hole, and means on said element operable to secure said base and cylinder head together.

31. The apparatus defined in claim 30 wherein said member is rotatably mounted on said base.

32. The apparatus defined in claim 30 and including in addition means providing a releasable stop for immobilizing said member at positions wherein the selected opening and corresponding bolt hole are aligned.

33. The apparatus defined in claim 32 wherein said stop comprises interengaged means on said base and member which disengage responsive to relative parting movement of said base and member generally parallel to the axes of said openings.

34. The apparatus defined in claim 33 wherein said member is rotatably mounted on said base and axially shiftable on its mount to facilitate said parting movement.

35. The apparatus defined in claim 34 wherein said interengaged means comprises a pin on said base and a plurality of recesses on said member.

36. The apparatus defined in claim 32 and including in addition means providing a visible index of the positions of said member.

37. Apparatus for repairing valve guide openings in cylinder heads which comprises,
- a base adapted to be fitted against the bottom of a cylinder head, guide means and support means on said base effective to support said guide means in general alignment with a valve seat on the cylinder head,
- said support means including means forming a connection through which said guide means is shiftable relative to said base in a plane substantially perpendicular to the axis of the valve seat,
- said guide means being movable on said support means generally along said axis toward the valve seat,
- centering means on said guide means engageable with the valve seat responsive to such movement of said guide means,
- said centering means being operable responsive to engagement thereof with the valve seat to shift said guide means into centered relation to the valve seat,
- said guide means being adapted to guidingly engage a bit for movement along said axis to facilitate enlarging the diameter of the valve guide opening,
- and means forming a driving tool engageable with said guide means for movement along said axis, said driving tool being operable to drive a valve guide bushing into said enlarged opening.

38. Apparatus for repairing valve guide openings in cylinder heads which comprises,
- a base adapted to be fitted against the bottom of a cylinder head,
- anchor means operable to anchor said base against the head,
- a carrier movably mounted on said base for movement into general alignment with a valve seat on the cylinder head,
- guide means supported by said carrier and being shifted on said carrier in a plane substantially perpendicular to the axis of the valve seat,
- centering means operable responsive to engagement thereof with a valve seat to shift said guide means relative to said carrier into centered relation to the valve seat,
- said guide means being adapted to guide a bit for movement along said axis to facilitate enlarging the diameter of the valve guide opening,
- said base having a plurality of openings therethrough, the distance between each opening and said guide means in operative position thereof corresponding to the distance between a bolt hole and a valve opening of one of a plurality of unlike cylinder heads,
- a pivot member insertable through said openings selectively and into a bolt hole in the cylinder head to facilitate rotation of said base relative to the head and consequent alignment of said carrier and guide means relative to a valve seat,
- said anchor means comprising means on said pivot member operable to secure said base and cylinder head together.

39. Apparatus for repairing valve guide openings in cylinder heads which comprises,
- a base adapted to be fitted against the bottom of a cylinder head,
- anchor means operable to anchor said base against the head,
- a carrier movably mounted on said base for movment into general alignment with a valve seat on the cylinder head,
- guide means supported by said carrier and being shiftable on said carrier in a plane substantially perpendicular to the axis of the valve seat,
- centering means operable responsive to engagement thereof with a valve seat to shift said guide means relative to said carrier into centered relation to the valve seat,
- said guide means being adapted to guide a bit for movement along said axis to facilitate enlarging the diameter of the valve guide opening,
- and means forming a driving tool engageable with said guide means for guided movement along said axis, said driving tool being operable to drive a valve guide bushing into the enlarged diameter opening.

40. The apparatus defined in claim 39 wherein said driving tool is interengageable within said guideway for said guided movement thereof.

41. Apparatus for repairing valve guide openings in cylinder heads which comprises,
- a base adapted to be fitted against the bottom of a cylinder head,
- anchor means operable to anchor said base against the head,
- a carrier movably mounted on said base for movement into general alignment with a valve seat on the cylinder head,
- guide means supported by said carrier and being shiftable on said carrier in a plane substantially perpendicular to the axis of the valve seat,
- centering means operable responsive to engagement thereof with a valve seat to shift said guide means relative to said carrier into centered relation to the valve seat,
- said guide means being adapted to guide a bit for movement along said axis to facilitate enlarging the diameter of the valve guide opening,
- means forming a locating tool engageable with said guide means for guided movement generally along said axis, said tool having a probe portion insertable within the valve guide opening for refining the alignment of said centering means relative to the valve seat prior to engagement of said centering means against the valve seat, said tool having a driving portion engageable with a valve guide bushing for driving the bushing into the enlarged diameter opening.

42. The apparatus defined in claim 41 wherein said driving portion comprises a shoulder adjacent said probe portion.

* * * * *

UNITED STATES PATENT OFFICE
CERTIFICATE OF CORRECTION

Patent No. 3,800,391　　　　　　　Dated April 2, 1974

Inventor(s) Richard W. Westbrook

It is certified that error appears in the above-identified patent and that said Letters Patent are hereby corrected as shown below:

In claim 38, column 11, line 62, "shifted" should be --shiftable--.

Signed and sealed this 30th day of July 1974.

(SEAL)
Attest:

McCOY M. GIBSON, JR.　　　　　　　　　C. MARSHALL DANN
Attesting Officer　　　　　　　　　　　Commissioner of Patents